United States Patent [19]
Bednar

[11] Patent Number: 6,047,530
[45] Date of Patent: Apr. 11, 2000

[54] GANG-TYPE ROTARY LAWN MOWER

[75] Inventor: Richard D. Bednar, Lake Mills, Wis.

[73] Assignee: Textron, Inc., Providence, R.I.

[21] Appl. No.: 08/794,141

[22] Filed: Feb. 3, 1997

[51] Int. Cl.[7] .................................................. A01D 34/66
[52] U.S. Cl. ............................ 56/6; 56/13.6; 56/DIG. 3; 56/DIG. 10; 56/DIG. 14
[58] Field of Search ........................ 56/6, 7, 13.6, 13.7, 56/13.8, 255, 295, DIG. 3, DIG. 9, DIG. 10, DIG. 11, DIG. 12, DIG. 13, DIG. 14

[56] References Cited

U.S. PATENT DOCUMENTS

| | | | |
|---|---|---|---|
| 1,961,710 | 6/1934 | Pol | 56/7 |
| 2,504,259 | 4/1950 | Ford | 56/25.4 |
| 2,936,561 | 5/1960 | Grimes | 56/7 |
| 3,070,938 | 1/1963 | Winget . | |
| 3,118,266 | 1/1964 | Colburn | 56/25.4 |
| 3,135,079 | 6/1964 | Dunn | 56/6 |
| 4,308,713 | 1/1982 | James | 56/11.9 |
| 4,901,507 | 2/1990 | Cracraft | 56/6 |
| 5,137,100 | 8/1992 | Scott et al. | 180/6.48 |
| 5,280,695 | 1/1994 | Nunes, Jr. et al. | 56/DIG. 14 X |
| 5,293,729 | 3/1994 | Curry et al. | 56/7 |
| 5,297,378 | 3/1994 | Smith | 56/7 |
| 5,343,680 | 9/1994 | Reichen et al. | 56/249 |
| 5,355,665 | 10/1994 | Peter | 56/15.8 |
| 5,412,932 | 5/1995 | Schueler | 56/249 |
| 5,423,565 | 6/1995 | Smith | 280/411.1 |
| 5,481,857 | 1/1996 | Umemoto et al. | 56/12.6 |
| 5,497,604 | 3/1996 | Lonn | 56/10.2 H |

FOREIGN PATENT DOCUMENTS

| | | |
|---|---|---|
| 0 342 700 | 11/1989 | European Pat. Off. . |
| 0 596 836 | 11/1993 | European Pat. Off. . |
| 7804519 | 8/1978 | Netherlands . |
| 88/05998 | 8/1988 | WIPO . |

OTHER PUBLICATIONS

Mountfield "Domestic Grass Machinery" (Date unknown).
Turf Blazer 1040 Diesel, Howard Price Turf Equipment (advertising brochure) (Date unknown).

*Primary Examiner*—Robert E. Pezzuto
*Attorney, Agent, or Firm*—Michael Best & Freidrich LLP

[57] ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

19 Claims, 5 Drawing Sheets

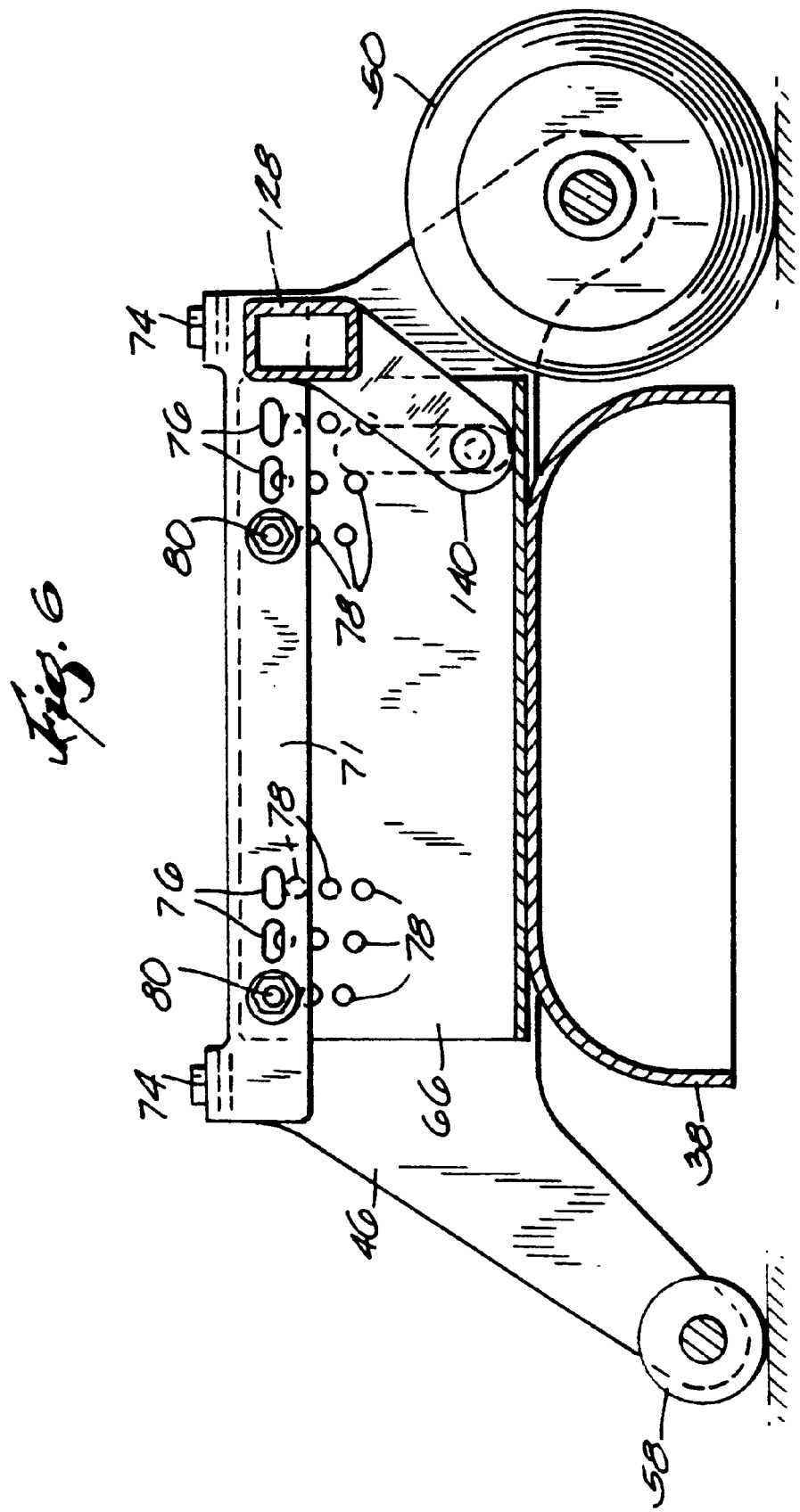

GANG-TYPE ROTARY LAWN MOWER

BACKGROUND OF THE INVENTION

The invention relates to rotary lawn mowers and to gang-type lawn mowers.

Historically, reel mowers have been used to cut golf course roughs. It is generally recognized that rotary mowers are better suited for cutting tall grass, where scalping is not a problem, while reel mowers are better for shorter cutting. A gang of reels can be either attached directly to the frame on which the operator rides, or pulled behind a tractor. Pull-behind or tow-behind rotary gangs are also known. These can be driven either by a power takeoff or by a separate engine. Tow-behind gangs, whether reel or rotary, are generally undesirable for cutting a golf course rough because close trimming is difficult. Thus, rotary mowers have not been used to cut golf course roughs, which require close trimming and the ability to cut undulating terrain at a relatively short length.

SUMMARY OF THE INVENTION

The invention provides a gang-type rotary lawn mower suitable for cutting a golf course rough. This is a tremendous improvement over the known prior art, because a rotary mower typically requires substantially less maintenance than a reel mower. The lawn mower has single-spindle cutting decks attached directly to the frame on which the operator rides, with a front row of two or more cutting decks in front of the front wheels, and with a rear row of one or more cutting decks between the front and rear wheels. The invention also provides an improved arrangement for mounting a rotary cutting deck on a lawn mower frame. Each deck is mounted on its own lifting arm so that the deck can move vertically relative to the frame and can pivot relative to the frame about three mutually perpendicular axes.

More particularly, the invention provides a gang-type rotary lawn mower comprising a frame supported by front and rear wheels, an operator's seat mounted on the frame, at least two side-by-side front cutting deck assemblies mounted on the frame in front of the front wheels, and at least one rear cutting deck assembly mounted on the frame behind the front wheels and in front of the rear wheels. Each of the front and rear deck assemblies includes a pair of laterally-spaced, generally vertically-extending side plates, front wheels supporting the side plates for movement over the ground, and a rear roller extending between the side plates and supporting the side plates for movement over the ground. Each deck assembly also includes a single-spindle cutting deck located between the side plates and in front of the roller, the deck being mounted on the side plates such that the height of the deck relative to the ground is adjustable. The roller extends across substantially the entire width of the deck. The roller resists scalping and stripes the grass, both of which are aesthetically desirable.

Each deck assembly is connected to the frame by a generally L-shaped, horizontally-extending lifting arm operable to lift the deck assembly relative to the frame. Each deck assembly is connected to the frame by its own lifting arm. Each lifting arm has an inner end pivotally connected to the frame. A cross member is mounted on the outer end of the lifting arm for pivotal movement about a generally vertical axis and about a generally horizontal axis extending in the forward-rearward direction. One end of the cross member is connected to one of the deck assembly side plates for pivotal movement about a generally horizontal, laterally-extending axis adjacent the forward ends of the side plates, and the other end of the cross member is connected to the other side plate for pivotal movement about the same axis.

This construction enables the lawn mower to cut the undulating terrain of a golf course rough and to be controlled for close trimming. Also, as mentioned above, the lawn mower requires much less maintenance than the reel mowers historically used to cut a golf course rough.

Other features and advantages of the invention will become apparent to those skilled in the art upon review of the following detailed description, claims and drawings.

DESCRIPTION OF THE DRAWINGS

FIG. 6 is a view taken along line 6—6 in FIG. 3.

Figure 1:
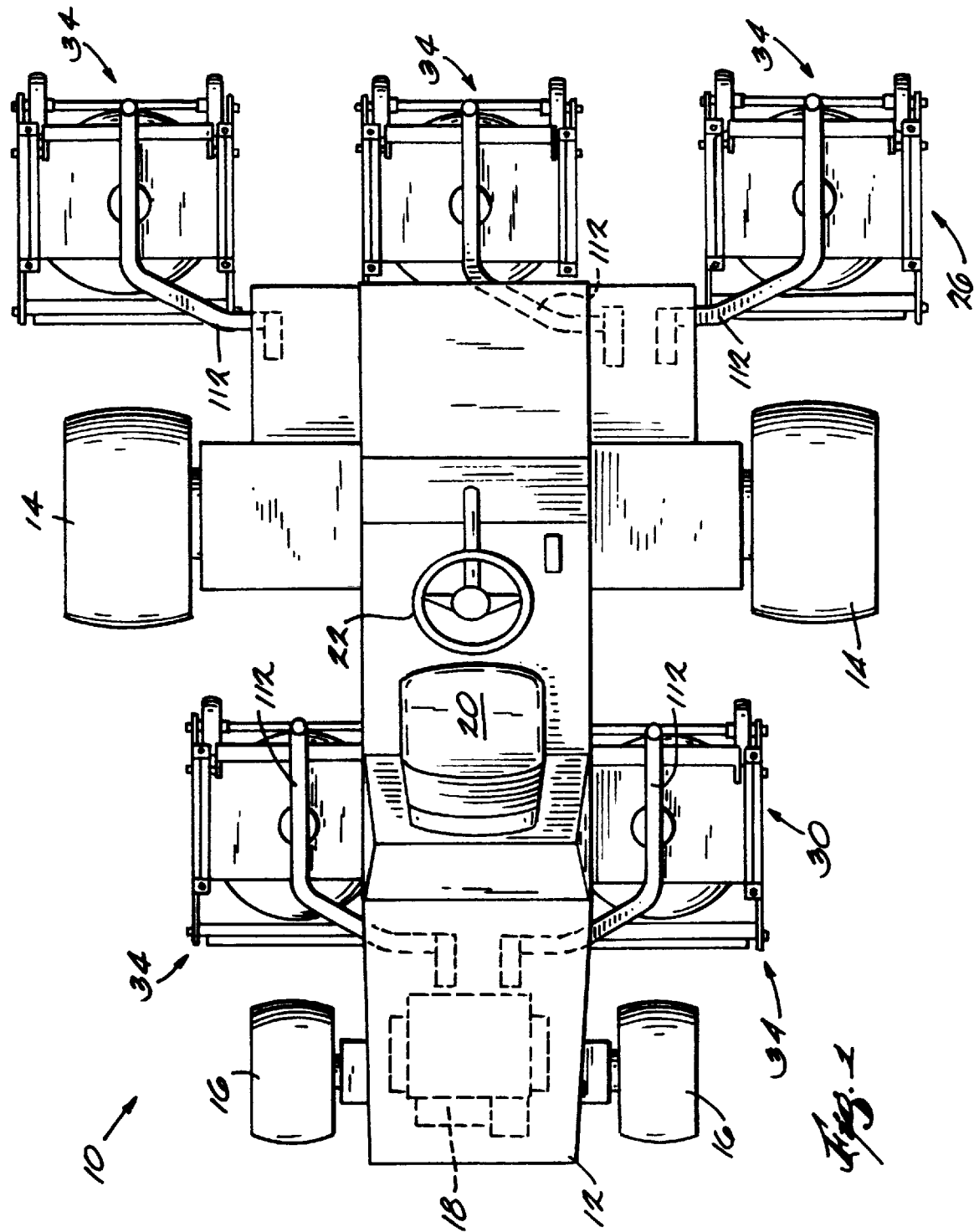
FIG. 1 is a top plan view of a lawn mower embodying the invention.
Figure 2:
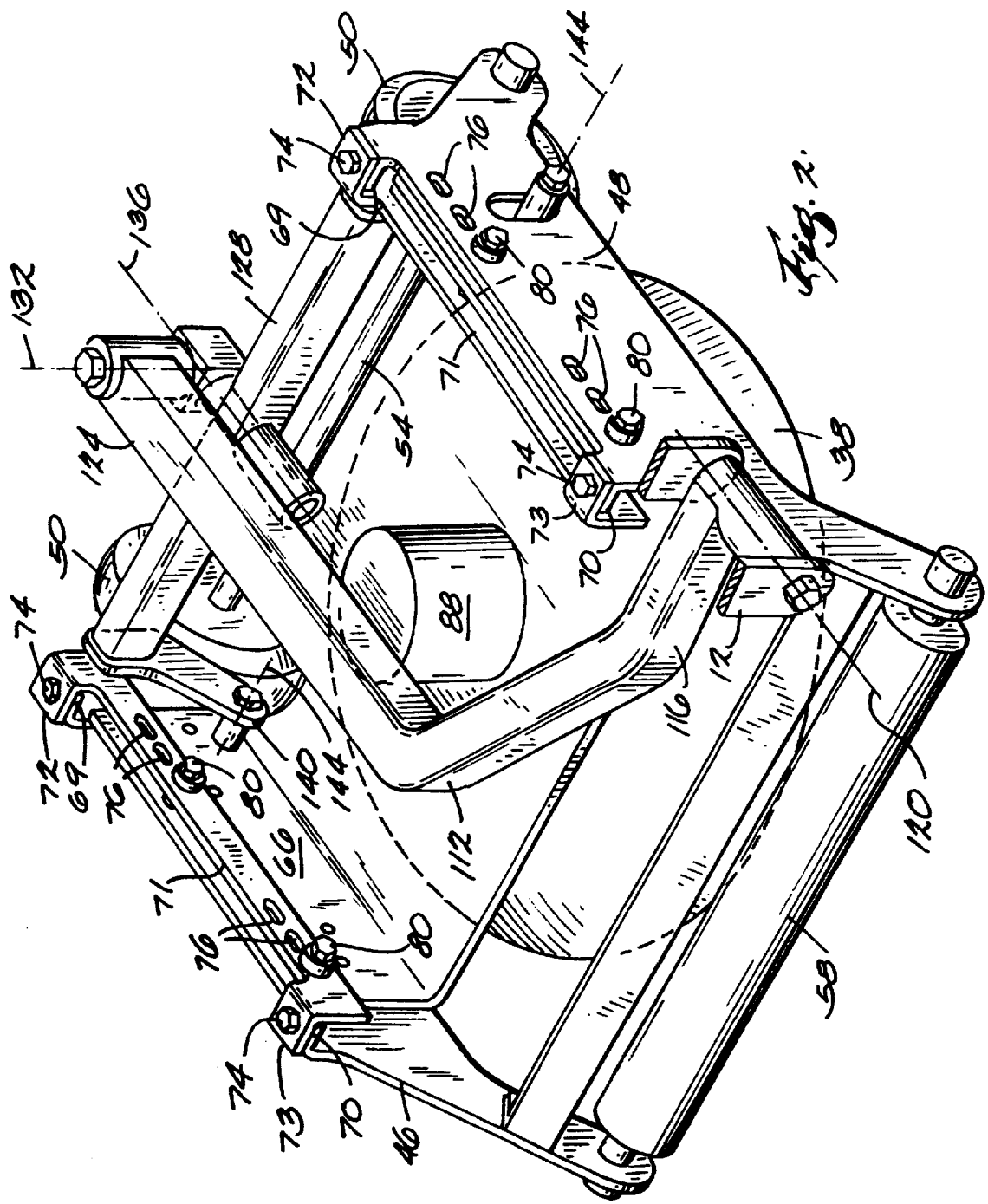
FIG. 2 is a perspective view of a cutting deck assembly.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A lawn mower 10 embodying the invention is illustrated in FIG. 1. Except as described below, the lawn mower 10 is identical to the lawn mower disclosed in U.S. patent application Ser. No. 08/787,384, filed Jan. 22, 1997, titled "PARALLEL-SERIES FOUR-WHEEL-DRIVE HYDRAULIC CIRCUIT FOR A RIDING LAWN MOWER" and assigned to the assignee hereof. The lawn mower 10 comprises a frame 12 (partially shown in FIGS. 2–5) supported by front wheels 14 and rear wheels 16 for movement over the ground. While the illustrated lawn mower 10 is rear-steering and has four-wheel drive, it should be understood that the invention is applicable to front-steering or two-wheel-drive lawn mowers.

The lawn mower 10 further comprises a power source 18 supported by the frame 12. The power source may be any type known in the art, such as a gasoline-powered, internal-combustion engine. The engine drives a hydraulic pump (not shown) that supplies hydraulic fluid to hydraulic motors (not shown) drivingly connected to the wheels 14 and 16. The lawn mower 10 further comprises an operator's seat 20, and a conventional steering system, including a steering wheel 22, enabling the operator to steer the lawn mower 10. In the illustrated construction, the steering system is hydraulic and is connected to the rear wheels 16 to steer the lawn mower 10.

The lawn mower 10 further comprises front and rear rows 26 and 30, respectively, of cutting deck assemblies 34. More particularly, in the illustrated construction, the lawn mower 10 has three side-by-side front cutting deck assemblies 34 in front of the front wheels 14, and two rear cutting deck assemblies 34 behind the front wheels 14 and in front of the rear wheels 16. As is known in the art, each rear deck assembly 34 is aligned with the gap between two adjacent front deck assemblies 34.

Figure 3:
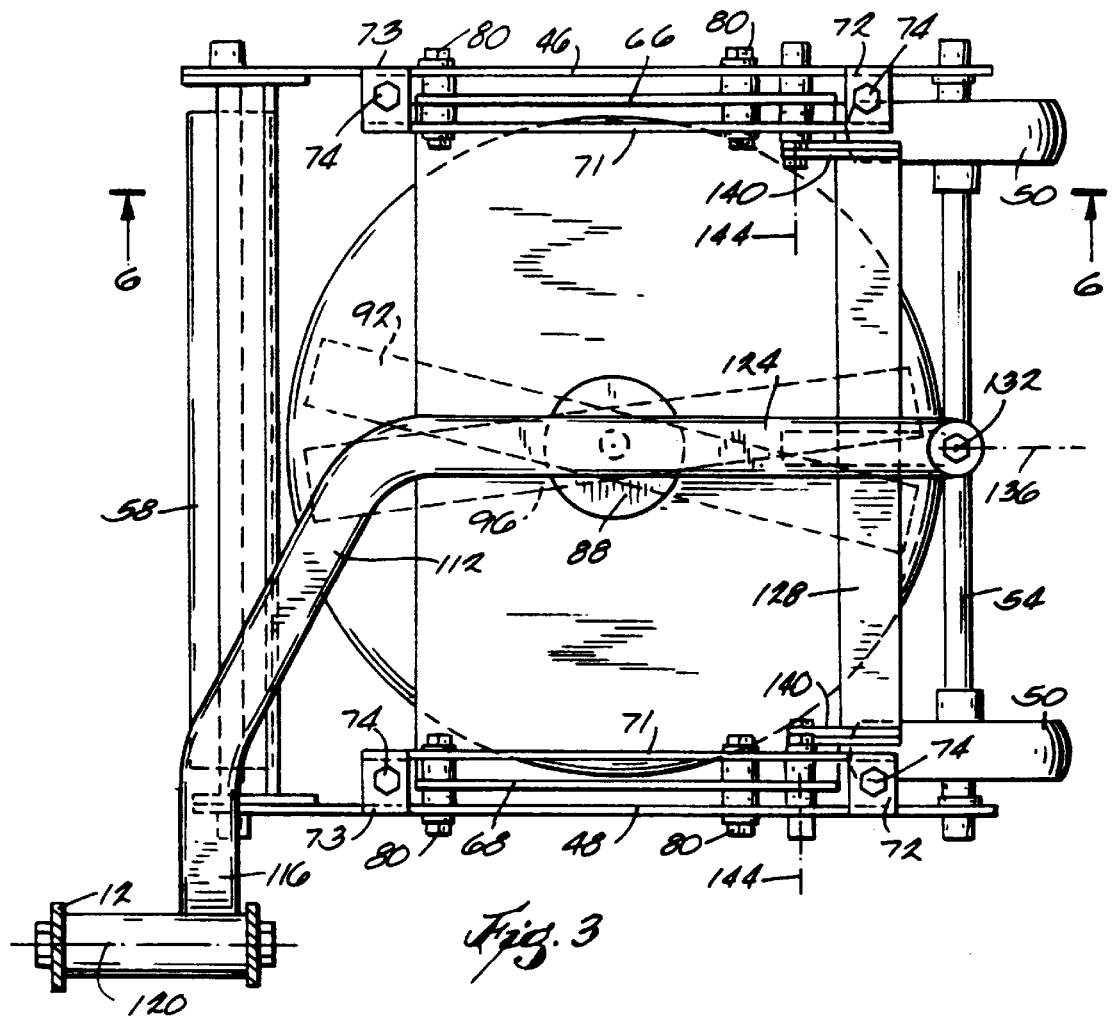
FIG. 3 is a top plan view of the cutting deck assembly.
Figure 4:
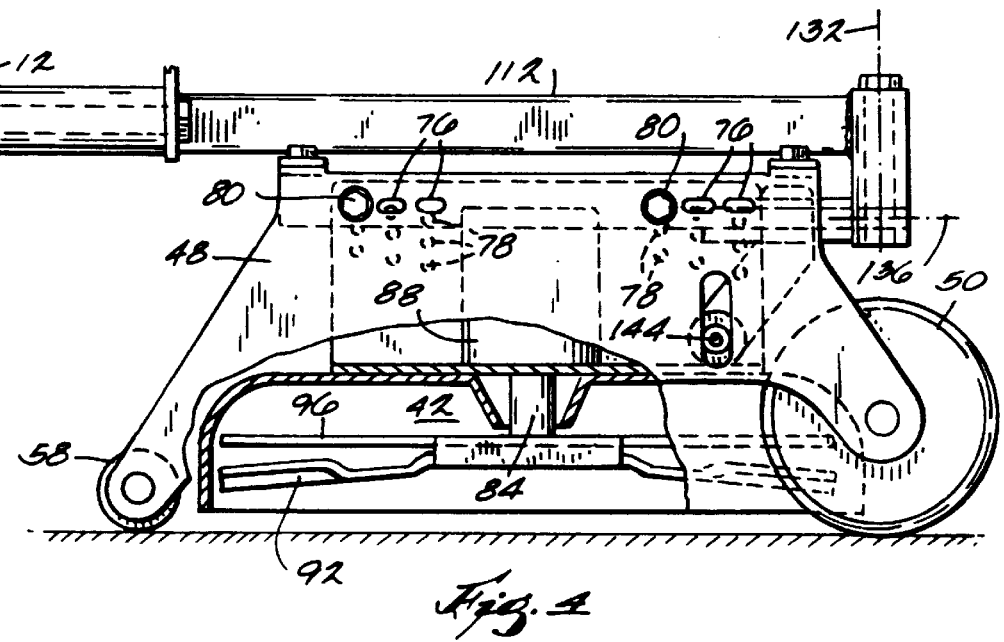
FIG. 4 is a side elevational view of the cutting deck assembly.
Figure 5:
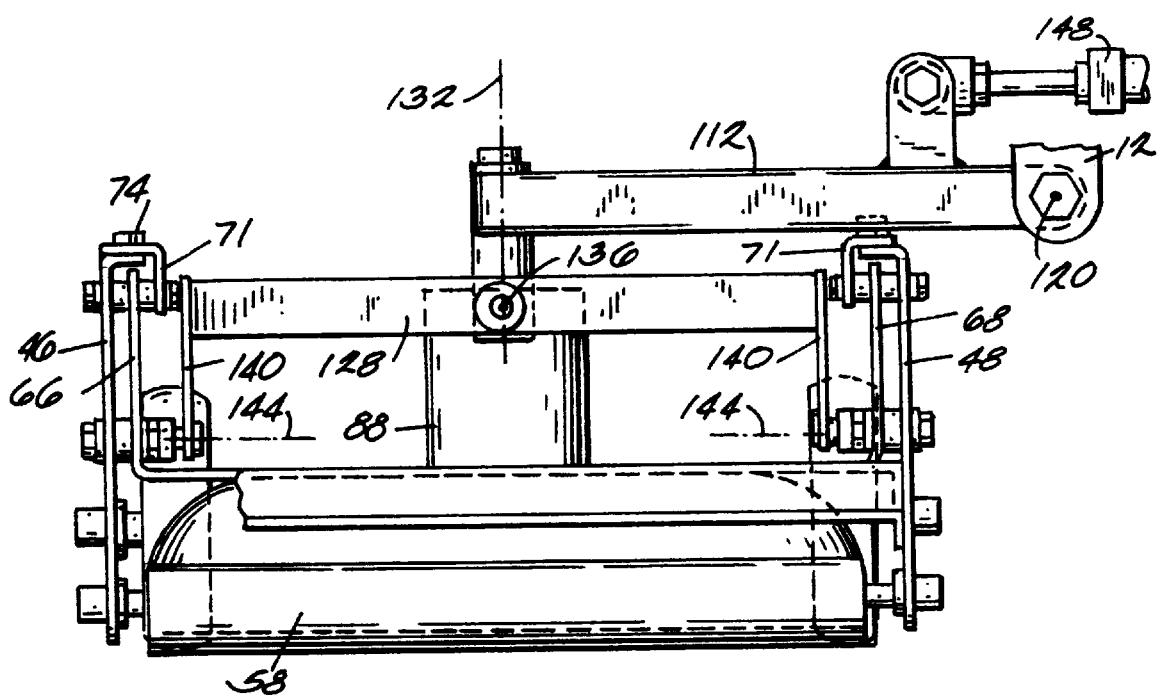
FIG. 5 is a rear elevational view of the cutting deck assembly.

Each of the cutting deck assemblies 34 includes (see FIGS. 2–5) a single-spindle mulching deck 38 defining a downwardly opening space 42 (FIG. 4). The deck 38 is located between and supported by a pair of laterally-spaced, generally vertically-extending side plates 46 and 48. The term "lateral" is used herein to mean the direction from one side of the lawn mower to the other, i.e., perpendicular to the forward-rearward direction. Two front wheels 50 rotate about an axle 54 (FIGS. 2 and 3) extending between the side plates 46 and 48 in front of the deck 38, such that each front wheel 50 supports one of the side plates 46 and 48 and the deck 38 for movement over the ground. A rear roller 58 extends between the side plates 46 and 48 and also supports the side plates 46 and 48 and the deck 38 for movement over the ground. The roller 58 is behind the deck 38 and extends across substantially the entire width of the deck 38. The roller 58 resists scalping and stripes the grass.

The deck 38 is mounted on the side plates 46 and 48 such that the height of the deck 38 relative to the ground is adjustable. In the illustrated construction, the deck 38 includes spaced deck plates 66 and 68 (FIGS. 3 and 5) extending upwardly adjacent the side plates 46 and 48, respectively. The upper end of each side plate 46 or 48 has thereon (see FIG. 2) generally horizontal, inwardly-extending ears 69 and 70, with the ear 69 adjacent the front of the side plate and the ear 70 adjacent the rear of the side plate. Fixed to the ears 69 and 70 of each side plate 46 or 48 is an elongated plate member 71 having outwardly-extending ears 72 and 73 respectively secured to the ears 69 and 70 by suitable means such as bolts or screws 74. Each side plate 46 or 48 and the corresponding plate member 71 has therein (see FIGS. 4 and 6) a series of holes 76. Each of the deck plates 66 and 68 has therein several vertically-spaced series of holes 78. Bolts 80 extending through holes 76 in the side plates 46 and 48 and in the plate members 71 and through holes 78 in the deck plates 66 and 68 secure the deck 38 to the side plates 46 and 48. The height of the deck 38 is adjusted by changing the holes 78 in the deck plates 66 and 68 and/or the holes in the side plates 46 and 48 and in the plate members 71 through which the bolts 80 extend.

A single spindle 84 (FIG. 4) is mounted for rotation about a generally vertical axis within the space 42 defined by the deck 38. The spindle 84 is driven by a hydraulic motor 88 on top of the deck 38. The above-mentioned pump supplies hydraulic fluid to the motor 88. It should be understood that other means could be used to drive the spindle 84.

A set of cutting blades is mounted on the spindle 84 for rotation therewith. In the illustrated construction, as shown in FIGS. 3 and 4, each blade set includes a lower, leading blade 92 and an upper, trailing blade 96. The leading blade 92 has a leading cutting edge and an upwardly angled trailing edge or lift. Preferably, the lift of the leading blade 92 is angled upwardly at an angle of approximately forty-five degrees. The trailing blade 96 has a leading cutting edge for cutting clippings deflected upwardly by the lift of the leading blade 92. The blades are preferably identical to those disclosed in U.S. patent application Ser. No. 08/787,382, filed Jan. 22, 1997, titled "ROTARY LAWN MOWER MULCHING DECK" and assigned to the assignee hereof. In alternative embodiments of the invention, different blade arrangements can be employed.

Each of the deck assemblies 34 is mounted on the frame 12 by a generally L-shaped, horizontally-extending lifting arm 112, such that each deck assembly is mounted on its own lifting arm 112. The lifting arm 112 has (see FIGS. 2 and 3) a laterally-extending inner leg 116 with an inner end connected to the frame 12 for pivotal movement about a generally horizontal axis 120 extending in the forward-rearward direction. The arm 112 also has an outer leg 124 extending in the forward-rearward direction. A cross member 128 is mounted on the outer end of the outer leg 124 for pivotal movement about a generally vertical axis 132 and about a generally horizontal axis 136 extending in the forward-rearward direction. Each of the opposite, laterally-spaced ends of the cross member 128 has thereon (see FIGS. 2, 3, 5 and 6) a downwardly and slightly rearwardly extending arm 140. The lower end of one arm 140 is connected to the side plate 46 for pivotal movement about a generally horizontal, laterally-extending axis 144 adjacent the forward ends of the side plates 46 and 48. The lower end of the other arm 140 is connected to the side plate 48 for pivotal movement about the axis 144.

A hydraulic assembly 148 (partially shown only in FIG. 5) connected between the arm 112 and the frame 12 pivots the arm about the axis 120 for lifting an d lowering the deck 38. When the deck is lowered for cutting, the hydraulic assembly allows the lifting arm to "float," thereby allowing the deck 38 to move vertically relative to the frame 12. The connection of the deck 38 to the arm 112 via the cross member 128 allows the deck 38 to pivot relative to the frame 12 about the three mutually perpendicular axes 132, 136 and 144. This mounting arrangement enables the deck 38 to adjust to undulating terrain, thereby substantially avoiding scalping.

It should be understood that the lawn mower 10 could have only two or more than three cutting decks in the front row, and only one or more than two cutting decks in the rear row. Also, other arrangements could be used to mount the decks on the frame 12.

Various features of the invention are set forth in the following claims.

I claim:

1. A gang-type rotary lawn mower comprising
    a frame supported by front and rear wheels for movement over the ground,
    a power source which is mounted on the frame and which drives at least two of the wheels,
    an operator's seat mounted on the frame,
    a steering system enabling the operator to steer the lawn mower,
    at least two side-by-side front rotary cutting deck assemblies mounted on the frame in front of the front wheels, the front deck assemblies defining a gap between adjacent front deck assemblies, and
    at least one rear rotary cutting deck assembly mounted on the frame behind the front deck assemblies and between the front and rear wheels, each rear deck assembly being aligned with a respective gap between adjacent front deck assemblies,
    each of the front and rear deck assemblies including a single-spindle cutting deck defining a downwardly opening space, a single spindle mounted for rotation about a generally vertical axis within the space, at least one cutting blade mounted on the spindle for rotation therewith, and a rear roller supporting the deck for movement over the ground, the deck having a width such that the roller extends across substantially the entire width of the deck.

2. A lawn mower as set forth in claim 1 wherein the front deck assemblies are mounted on the frame in front of the front wheels, and the rear deck assembly is mounted on the frame behind the front wheels and in front of the rear wheels.

3. A lawn mower as set forth in claim 1 wherein each deck assembly is connected to the frame by a respective lifting arm operable to lift the associated deck assembly relative to the frame, such that each of the deck assemblies is connected by its own lifting arm to the frame.

4. A lawn mower as set forth in claim 1 wherein each of the front and rear deck assemblies includes a pair of laterally-spaced, generally vertically-extending side plates having forward ends, a first front wheel supporting one of the side plates for movement over the ground, and a second front wheel supporting the other of the side plates for movement over the ground, wherein the rear roller extends between the side plates and supports the side plates for movement over the ground, wherein the associated deck is located between the side plates and in front of the roller and is mounted on the side plates such that the height of the deck relative to the ground is adjustable by changing the position of the deck relative to the side plates.

5. A lawn mower as set forth in claim 1 wherein each deck assembly also includes a hydraulic motor which is mounted on the deck and which is drivingly connected to the spindle.

6. A lawn mower as set forth in claim 1 wherein each deck assembly includes a set of cutting blades mounted on the spindle for rotation therewith, the set of blades including a lower, leading blade having a leading cutting edge and an upwardly angled trailing edge, and an upper, trailing blade having a leading cutting edge for cutting clippings deflected upwardly by the upwardly angled trailing edge of the leading blade, the trailing blade extending at a non-perpendicular angle relative to the leading blade so that clippings coming off the trailing edge of the leading blade are cut immediately by the trailing blade before the clippings start swirling around within the space.

7. A gang-type rotary lawn mower comprising a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a pair of laterally-spaced, generally vertically-extending side plates, a single-spindle cutting deck defining a downwardly opening space, the deck being mounted between the side plates, a single spindle mounted for rotation about a generally vertical axis within the space, and at least one cutting blade mounted on the spindle for rotation therewith, wherein each deck assembly is connected to the frame in part by a cross member connected to the frame for pivotal movement about a generally vertical axis and about a generally horizontal axis extending in the forward-rearward direction, the cross member having opposite, laterally-spaced ends, one of the cross member ends being connected to one of the side plates of the associated deck assembly for pivotal movement about a generally horizontal, laterally-extending axis adjacent the forward ends of the side plates, and the other of the cross member ends being connected to the other of the side plates of the associated deck assembly for pivotal movement about the generally horizontal, laterally-extending axis, the ends of the cross member having thereon respective downwardly extending arms, the arms having respective lower ends, the lower end of one of the arms being connected to one of the side plates for pivotal movement about the generally horizontal, laterally-extending axis, and the lower end of the other of the arms being connected to the other of the side plates for pivotal movement about the generally horizontal, laterally-extending axis.

8. A gang-type rotary lawn mower comprising a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a pair of laterally-spaced, generally vertically-extending side plates, a single-spindle cutting deck defining a downwardly opening space, the deck being mounted between the side plates, a single spindle mounted for rotation about a generally vertical axis within the space, and at least one cutting blade mounted on the spindle for rotation therewith, wherein each deck assembly is connected to the frame in part by a cross member connected to the frame for pivotal movement about a generally vertical axis and about a generally horizontal axis extending in the forward-rearward direction, the cross member having opposite, laterally-spaced ends, one of the cross member ends being connected to one of the side plates of the associated deck assembly for pivotal movement about a generally horizontal, laterally-extending axis adjacent the forward ends of the side plates, and the other of the cross member ends being connected to the other of the side plates of the associated deck assembly for pivotal movement about the generally horizontal, laterally-extending axis, wherein each of the deck assemblies is connected to the frame by a respective generally L-shaped, horizontally-extending arm having a laterally-extending inner leg with an inner end connected to the frame for pivotal movement about a generally horizontal axis extending in the forward-rearward direction, and the arm having an outer leg extending in the forward-rearward direction, the outer leg having an outer end, and wherein the cross member is mounted on the outer end of the outer leg.

9. A lawn mower as set forth in claim 8 wherein the arm is operable to lift the associated deck assembly relative to the frame.

10. A rotary lawn mower comprising a frame supported by wheels for movement over the ground, a power source which is mounted on the frame and which drives at least two of the wheels, an operator's seat mounted on the frame, a steering system enabling the operator to steer the lawn mower, and a rotary cutting deck assembly including a pair of laterally-spaced, generally vertically-extending side plates which have forward ends and which are supported for movement over the ground, a single-spindle cutting deck defining a downwardly opening space, the deck being located between the side plates and being mounted on the side plates such that the height of the deck relative to the ground is adjustable, a single spindle mounted for rotation about a generally vertical axis within the space, and at least one cutting blade mounted on the spindle for rotation therewith, the deck assembly being connected to the frame in part by a cross member connected to the frame for pivotal movement about a generally vertical axis and about a generally horizontal axis extending in the forward-rearward direction, the cross member having opposite, laterally-spaced ends, one of the cross member ends being connected to one of the side plates for pivotal movement about a generally horizontal, laterally-extending axis adjacent the forward ends of the side plates, and the other of the cross member ends being connected to the other of the side plates for pivotal movement about the generally horizontal, laterally-extending axis, wherein the deck assembly is connected to the frame by a generally L-shaped, horizontally-extending arm having a laterally-extending inner leg with an inner end connected to the frame for pivotal movement about a generally horizontal axis extending in the forward-rearward direction, and the arm having an outer leg extending in the forward-rearward direction, the outer leg having an outer end, and wherein the cross member is mounted on the outer end of the outer leg.

11. A lawn mower as set forth in claim 10 wherein the arm is operable to lift the deck assembly relative to the frame.

12. A rotary lawn mower comprising a frame supported by wheels for movement over the ground, a power source which is mounted on the frame and which drives at least two of the wheels, an operator's seat mounted on the frame, a steering system enabling the operator to steer the lawn mower, and a rotary cutting deck assembly including a pair of laterally-spaced, generally vertically-extending side plates which have forward ends and which are supported for movement over the ground, a single-spindle cutting deck defining a downwardly opening space, the deck being located between the side plates and being mounted on the side plates such that the height of the deck relative to the ground is adjustable by changing the position of the deck relative to the side plates, a single spindle mounted for rotation about a generally vertical axis within the space, and at least one cutting blade mounted on the spindle for rotation therewith, the deck assembly being connected to the frame in part by a cross member connected to the frame for pivotal movement about a generally vertical axis and about a generally horizontal axis extending in the forward-rearward direction, the cross member having opposite, laterally-spaced ends, one of the cross member ends being connected to one of the side plates for pivotal movement about a generally horizontal, laterally-extending axis adjacent the forward ends of the side plates, and the other of the cross member ends being connected to the other of the side plates for pivotal movement about the generally horizontal, laterally-extending axis.

13. A lawn mower as set forth in claim 12 wherein the deck assembly also includes a hydraulic motor which is mounted on the deck and which is drivingly connected to the spindle.

14. A lawn mower as set forth in claim 12 wherein the deck assembly includes a set of cutting blades mounted on the spindle for rotation therewith, the set of blades including a lower, leading blade having a leading cutting edge and an upwardly angled trailing edge, and an upper, trailing blade having a leading cutting edge for cutting clippings deflected upwardly by the upwardly angled trailing edge of the leading blade, the trailing blade extending at a non-perpendicular angle relative to the leading blade so that clippings coming off the trailing edge of the leading blade are cut immediately by the trailing blade before the clippings start swirling around within the space.

15. A lawn mower as set forth in claim 12 wherein the deck assembly also includes a first front wheel supporting one of the side plates for movement over the ground, a second front wheel supporting the other of the side plates for movement over the ground, and a rear roller extending between the side plates and supporting the side plates for movement over the ground, wherein the deck is located in front of the roller, and wherein the deck has a width such that the roller extends across substantially the entire width of the deck.

16. A lawn mower as set forth in claim 12 wherein the ends of the cross member have thereon respective downwardly extending arms, the arms having respective lower ends, the lower end of one of the arms being connected to one of the side plates for pivotal movement about the generally horizontal, laterally-extending axis, and the lower end of the other of the arms being connected to the other of the side plates for pivotal movement about the generally horizontal, laterally-extending axis.

17. A gang-type rotary lawn mower comprising a frame, a pair of front wheels supporting the frame for movement over the ground, a pair of rear wheels supporting the frame for movement over the ground, a power source which is mounted on the frame and which drives at least one of the pairs of wheels, an operator's seat mounted on the frame, a steering system enabling the operator to steer the lawn mower, at least two side-by-side front rotary cutting deck assemblies mounted on the frame in front of the front wheels, the front deck assemblies defining a gap between adjacent front deck assemblies, and at least one rear rotary cutting deck assembly mounted on the frame behind the front wheels and in front of the rear wheels, each rear deck assembly being aligned with a respective gap between adjacent front deck assemblies, each of the front and rear deck assemblies including a pair of laterally-spaced, generally vertically-extending side plates having forward ends, a first front wheel supporting one of the side plates for movement over the ground, a second front wheel supporting the other of the side plates for movement over the ground, a rear roller extending between the side plates and supporting the side plates for movement over the ground, a single-spindle cutting deck defining a downwardly opening space, the deck being located between the side plates and in front of the roller and being mounted on the side plates such that the height of the deck relative to the ground is adjustable, the deck having a width such that the roller extends across substantially the entire width of the deck, a single spindle mounted for rotation about a generally vertical axis within the space, at least one cutting blade mounted on the spindle for rotation therewith, and each of the deck assemblies being connected to the frame by a respective generally L-shaped, horizontally-extending lifting arm operable to lift the associated deck assembly relative to the frame, such that each of the deck assemblies is connected by its own lifting arm to the frame, each arm having a laterally-extending inner leg with an inner end connected to the frame for pivotal movement about a generally horizontal axis extending in the forward-rearward direction, and each arm having an outer leg extending in the forward-rearward direction, the outer leg having an outer end, and a cross member mounted on the outer end of the outer leg for pivotal movement about a generally vertical axis and about a generally horizontal axis extending in the forward-rearward direction, the cross member having opposite, laterally-spaced ends, one of the cross member ends being connected to one of the side plates of the associated deck assembly for pivotal movement about a generally horizontal, laterally-extending axis adjacent the forward ends of the side plates, and the other of the cross member ends being connected to the other of the side plates of the associated deck assembly for pivotal movement about the generally horizontal, laterally-extending axis.

18. A lawn mower as set forth in claim 17 wherein each deck assembly also includes a hydraulic motor which is mounted on the deck and which is drivingly connected to the spindle.

19. A lawn mower as set forth in claim 17 wherein each deck assembly includes a set of cutting blades mounted on the spindle for rotation therewith, the set of blades including a lower, leading blade having a leading cutting edge and an upwardly angled trailing edge, and an upper, trailing blade having a leading cutting edge for cutting clippings deflected upwardly by the upwardly angled trailing edge of the leading blade, the trailing blade extending at a non-perpendicular angle relative to the leading blade so that clippings coming off the trailing edge of the leading blade are cut immediately by the trailing blade before the clippings start swirling around within the space.

\* \* \* \* \*

(12) EX PARTE REEXAMINATION CERTIFICATE (8585th)
United States Patent
Bednar

(10) Number: US 6,047,530 C1
(45) Certificate Issued: Oct. 4, 2011

(54) GANG-TYPE ROTARY LAWN MOWER

(75) Inventor: Richard D. Bednar, Lake Mills, WI (US)

(73) Assignee: Textron Innovations Inc., Providence, RI (US)

Reexamination Request:
No. 90/008,547, Apr. 26, 2007

Reexamination Certificate for:
Patent No.: 6,047,530
Issued: Apr. 11, 2000
Appl. No.: 08/794,141
Filed: Feb. 3, 1997

(51) Int. Cl.
*A01D 34/66* (2006.01)

(52) U.S. Cl. .................. 56/6; 56/13.6; 56/DIG. 3; 56/DIG. 10; 56/DIG. 14

(58) Field of Classification Search .................. None
See application file for complete search history.

(56) References Cited

U.S. PATENT DOCUMENTS

| | | |
|---|---|---|
| 1,954,579 A | 10/1930 | Smith |
| 3,135,079 A | 6/1964 | Dunn |
| 3,236,034 A | 2/1966 | Blettner |
| 3,537,720 A | 11/1970 | Irgens |
| 3,611,684 A | 10/1971 | Irgens |
| 3,616,626 A | 11/1971 | Bramley |
| 3,650,098 A | 3/1972 | Folk |
| 3,654,749 A | 4/1972 | Ostergren |
| 3,754,385 A | 8/1973 | Hoffmeyer |
| 3,802,172 A | 4/1974 | Mathews |
| 3,968,630 A | 7/1976 | Mitchell |
| 4,304,086 A | 12/1981 | Stuchl |
| 4,308,713 A | 1/1982 | James |
| 4,416,109 A | 11/1983 | Slazas |
| 4,878,338 A | 11/1989 | Aldred et al. |
| 4,926,621 A | 5/1990 | Torras |
| 5,085,044 A | 2/1992 | Freier et al. |
| 5,109,655 A | 5/1992 | Tekulve |
| 5,133,176 A | 7/1992 | Baumann et al. |

(Continued)

FOREIGN PATENT DOCUMENTS

| | | |
|---|---|---|
| AU | 50523/64 | 4/1967 |
| AU | 13463/70 | 4/1969 |
| AU | 421366 | 9/1971 |
| AU | 11914/70 | 9/1971 |
| CA | 1115067 | 12/1981 |
| CA | 1141177 | 2/1983 |
| EP | 0 342 700 B1 | 1/1994 |
| GB | 1 273 760 | 12/1972 |
| GB | 1 544 914 | 4/1979 |
| ZA | 924978 | 7/1992 |
| ZA | 942089 | 3/1994 |

OTHER PUBLICATIONS

Council Directive on the approximation of the laws of the Member States relating to machiner (89/392/EEC), Official Journal of the European Communities, N. L. 183/9, Jun. 14, 1989.

(Continued)

*Primary Examiner*—Jeffrey R. Jastrzab

(57) ABSTRACT

A gang-type rotary lawn mower including a frame supported by wheels for movement over the ground, a power source which is mounted on the frame and which drives at least two of the wheels, an operator's seat mounted on the frame, a steering system enabling the operator to steer the lawn mower, at least two side-by-side front rotary cutting deck assemblies mounted on the frame, the front deck assemblies defining a gap between adjacent front deck assemblies, and at least one rear rotary cutting deck assembly mounted on the frame behind the front deck assemblies, each rear deck assembly being aligned with a respective gap between adjacent front deck assemblies, each of the front and rear deck assemblies including a single-spindle mulching deck defining a downwardly opening space, a single spindle mounted for rotation about a generally vertical axis within the space, and at least one cutting blade mounted on the spindle for rotation therewith.

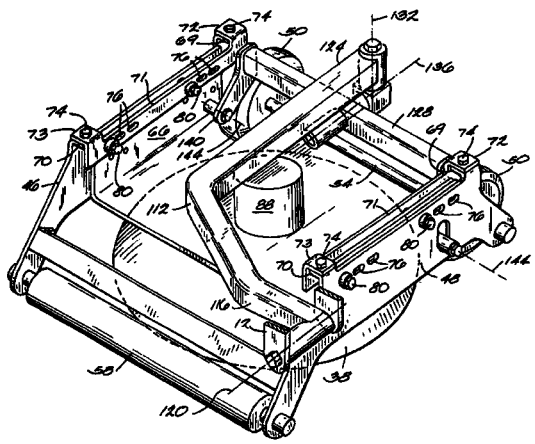

U.S. PATENT DOCUMENTS

| | | | |
|---|---|---|---|
| 5,212,938 | A | 5/1993 | Zenner et al. |
| 5,280,695 | A | 1/1994 | Nunes, Jr. |
| 5,293,729 | A | 3/1994 | Curry |
| 5,297,378 | A | 3/1994 | Smith |
| 5,305,589 | A | 4/1994 | Rodriguez |
| 5,343,680 | A | 9/1994 | Reichen et al. |
| 5,406,778 | A | 4/1995 | Lamb et al. |
| 5,481,857 | A | 1/1996 | Umemoto et al. |
| 5,497,604 | A | 3/1996 | Lonn |
| 5,533,325 | A | 7/1996 | Sallstrom et al. |
| 5,715,667 | A | 2/1998 | Goman et al. |
| 5,771,669 | A | 6/1998 | Langworthy |
| 5,890,354 | A | 4/1999 | Bednar |
| 6,032,441 | A | 3/2000 | Gust |
| 6,470,663 | B2 | 10/2002 | Langworthy |
| 6,484,481 | B1 | 11/2002 | Langworthy |
| 6,571,543 | B1 | 6/2003 | Nunes, Jr. |
| 2002/0157362 | A1 | 10/2002 | Nunes, Jr. |

OTHER PUBLICATIONS

Declaration of Fred Eberlein, 5 pages (Mar. 14, 2006).
Lesco 500D Fairway Mower Exploded View Drawings and Parts Lists, 23 pages (1989).
Brochure: Nunes Rotary Mower—John Deere 3365 Deck Attachement (Jun. 1993).
Excerpt: Nunes Manufacturing Sales Manual—John Deere Model 3235A (1996–handwritten).
Brochure: R.T.S. Rotary Cutters, 1 page (undated).
Brochure(s): Beaver T24 Hydraulic Triple Mower, 6 pages (Aug. 1992).
Photograph: John Deere 3235A, (undated).
Brochure: Jacobsen HR–5111 4WD Hydraulic Mower, 3 pages (1994).
Article: "Old and New Mower Mix to Provide Best," Golf & Sports TURF, 4 pages (Mar. 1991).
Advertisement: Ground Maintenance, "Howard Price Turf Equipment: Introducing the Hydro–Power 1280" (Dec. 1995—handwritten).
Advertisement: Landscape Management, "Howard Price Turf Equipment Turf Blazer 1260" (Feb. 1995—Handwritten).
Adverstisement: Ground Maintenance, "Howard Price Turf Equipment Hydro Power 180" (Feb. 1991—Handwritten).
BEFCO website <http://befco.com/products/flex/ez–flex.html> <http://befco.com/products/flex/default.html>, 4 pages (printed Jan. 5, 2002).
Brochure: ASTEC Articlator models 425D, 2 pages (1998—labeled).
Brochure: ASTEC Articulator models 325ER, 2 pages (1997—labeled).
Brochure: ASTEC Articulator models 325E, 6 pages (1997—labeled).
Article: Turf Management, "Cream of the Crop," 2 pages (Apr. 1993).
Brochure: Nunes Finish Cut 11' Mower (1991).
Adverstisement: Lansdcape Management, "LandPride Turf" (Apr. 1995—handwritten).
Advertisement: Hustler 320 and 340 (Jul. 1986).
Excerpt: Nunes Manufacturing Sales Manual—attachment for Toro 6500, 6700; John Deere 3235A (undated).
Article: Grounds Maintenance, "Rotaries Take to Golf Courses," 3 pages (Jan. 1991).
Brochure: Toro Groundsmaster 455–D, 4 pages (1992).
Article: Grounds Maintenance, "Out–Front Rotary Mowers," 7 pages (May 1991).
Article: Parks and Sports Grounds, "Problem Solver" (Mar. 1992—handwritten).
Brochure: Toppers Grasscare Major, 2 pages (1989—handwritten).
Article: Greenskeeper International, "Around the Green" (Aug. 1993—handwritten).
Brochure: Major Groundsmajor Rollermower Range, 2 pages (Apr. 1992—handwritten).
Article: Turf Management, "Cheap and Careful," 7 pages (May 1994).
Adverstisement: United Equipment Uni–Cut (Jan. 1995—handwritten).
Advertisement: Turf Management, Turfmech (May 1994).
Horticulture Week, "Suppliers List" (Kilworth Sovema), 2 pages (May 1996).
Kilworth Machinery website: Sovema EMH2 Finishing and EM2 Finishing Mower, <http://www.kilworthmachinery.co.uk/implements/mowing–emh2.htm> <http://www.kilworthmachinery.co.uk/implements/mowing–em2.htm>, 2 pages (printed Apr. 15, 2006).
Article: Turf Management, "Show Preview" (Sep. 1995).
Advertisement: Amenity Management (Feb. 1996).
Web Article: "Cutlass PRO/AM Mower," <http://www.portagric.co.uk/folders/cutlassproammower.htm>, 1 page (printed Apr. 15, 2002)
Brochure: Honda Power Equipment, "Honda Law & Garden Care," 16 pages (Nov. 1987).
Manual: Simplicity Parts Manual—FC Hydro Series, 4 pages (1995).
Parts List: Wentelsnyder Onderdele, 5 pages (1992/93).
Brochure: Dowdeswell Rollermowers, 2 pages (Apr. 1993).
Excerpt: Owner's Manual for Howard RLM180 Rollamowa, 4 pages (Nov. 1979).
Advertisement: The Groundsman Peterborough Catalogue, Votex Rotary Cutters, 2 pages (Aug. 1991).
Article: Landscape & Irrigation, "Equipment Preview 1987," 4 pages (Nov. 1986).
Article: USGA Green Section Record, "1986: The Season in Review," 5 pages (1986).
Article: USGA Green Section Record, "The Quest for Great Fairways," 3 pages (Jul./Aug. 1986).
Article: Grounds Maintenance, "Mowing Large Areas," 4 pages (Jul. 1989).
Article: The Groundsman, "Cutting a Systematic Swathe," 5 pages (Jul. 1993—handwritten).
Brochure: "Jacobsen Newsreel," 18 pages (Spring 1992).
Article: Sebring News, 4 pages (Jan. 27, 1988).
Excerpts: Owners Manual and Assembly Instructions for Simplicity Rotary Trailing Mowers, 26 pages (undated).
Excerpts: Brian Bell & Stewart Cousins, Machinery for Horticulture, 27 pages (1991).
Catalog: Douglas Products 1993 Catalog, 80 pages (1993).
Photograph (1992).
Brochure: Ransomes 250 Lightweight Fairway Mower, 2 pages (1994).
Brochure: Turf Star Electra Model 2000, 2 pages (1994).
Brochure: Stiga Park, 6 pages (1994).
Article: Golf Course News, "Triplex Mowers Offer Versatility, Quality Cut," 5 pages (Jun. 2004).
Article: Grounds Maintence, "Contour Mowers" 4 pages (May 1, 1998).

Lastec Website: "Articulating Rotaries A Better Mouse Trap" <http://www.lastec.com/profile.html> 2 pages (Apr. 2003; printed Feb. 21, 2008).

Lastec Website: "Professional Golf & Turf Equipment" <http://www.lastec.com/pro.aspx> 2 pages (Apr. 2003, printed Feb. 21, 2008).

Service Manual: Toro Groundmaster 3000/3000–D (except, Contour 82Δ Cutting Unit), 28 pages (1997, 1998, 2003, 2004).

Brochure: Toro Groundsmaster 580–D, 10 pages (1994).

Brochure: Saltex Official Catalogue and Buyers Guide, 136 pages (Sep. 1995).

Brochure: Toro Contour 82 Rotary Mowing Deck (1997).

Article: Golfdom Magazine, "Rotary Club," 3 pages (Oct. 1, 2002).

Brochure: Toro Groundsmaster 4000–D and 4100–D, 6 pages (2003).

Drawings: Nunes Mower Deck (various), 5 pages (Jul. 28, 1980).

Brochure: Nunes Finish Cut 17" Mower (Jun. 1992).

Brochure: Nunes Finish Cut 15" Mower (Jun. 1992).

Brochure: Nunes Finish Cut 12" Mower (Feb. 1991).

Specifications: Nunes 375 Wide Area Rotary Mower (1989).

Manual: Operating and Maintenance Instructions—Nunes Finish Cut Mowers, 9 pages (1991).

Specifications: Nunes 345 Wide Area Rotary Mower (1993).

Brochure: Nunes Model 6755T (2000).

Brochure: Toro Groundsmaster 300 Series Guardian 72Δ Recycler, 2 pages (1992).

Brochure: Toro Triflex 88Δ Cutting Unit for Groundsmaster 322–D and 327, 4 pages (1997).

Brochure: Hustler Out–Fronts, 7 pages (1992).

Catalog: Douglas Products 1992 Catalog, 9 pages (1992).

Manual: Steiner Rotary Mower Models MD448, MD460, MD472, 25 pages (1991).

Manual: Ransomes Boom Mower Model MB425, 41 pages (1991).

Press Release: "Ransomes Equipment to Groom Congressional Club for 1997 U.S. Open," 3 pages (May 1997).

Brochure: Ransomes AR–250 Rotary Mower, 2 pages (1997).

Brochure: Ransomes AR–250 and AR–250 Turbo Fine–Cut Rotary Mowers, 6 pages (2000).

Excerpt: James B. Baird, "Turf Management for Golf Courses," United States Golf Association, Macmillan Publishing, New York, 6 pages (1982).

Brochure: Toro Groundsmaster 580–D, 8 pages (1990).

Article: Golf & Groundscare, "Big Willy Catches the Eye" (Nov./Dec. 1997).

Brochure: Jacobsen HR–4600 Turbo, 6 pages (1999).

Webpage: Ransomes Jaguar 4000 <www.machinefinder.com/machine_detail.html?equipid=513276> (printed Oct. 9, 2006).

Brochure: Ransomes 700 Series, 8 pages (1999).

Brochure: Jacobsen Turf–Cat 600 Series, 4 pages (2000).

Catalogue: Steiner, 18 pages (1997).

Drawings: Risborough Rotary Cutterhead Parts Drawings, 7 pages (Aug. 8, 1995—handwritten).

Declaration of Frede Sorenson, 2 pages (Mar. 22, 2007).

Brochure, "Beaver T24," *Hayter PLC*, 2 pgs. (Aug. 1992).

Michael Bird, "Cheap and Careful," *Turf Management*, p. 31, 33–34, 37 (USA May 1994).

Borchure, "Honda Lawn and Garden Care," *Honda*, 16 pgs. (Nov. 1987).

Article, "Improved Roller Mower Makes Debut," *Tillage by Dowdeswell*, p. 14 (Winter 1994).

Photograph and Caption, Kilsworth's Soverna EMHZ 72, *Horticulture Week*, p. 31, 33 (May 1996).

Brochure, "The Lesco 500 Fairway Mower," *Lesco, Inc.*, 4 pgs. (USA 1988).

Photograph, Lesco 500D Rotary Gang Mower, *The Sebring News*, p. 13A (USA Jan. 1988).

Brochure, "Middleworth," *Middleworth Engineering and Manufacturing, Inc.*, 2 pgs. (prior to 1990) (date established by deposition testimony of Tom Middlesworth (attached hereto) at p. 55).

Manual, "Operator's Manual and Parts List," *Middlesworth Engineering and Manufacturing, Inc.*, 27 pgs. (1984) (date established by deposition testimony of Tom Middlesworth (attached hereto) at p. 74).

Brochure, "Nunes Rotary Mower," *Nunes Manufacturing*, 1 pg. (Jun. 1993).

Manual, "Ransomes Boom Mower, Model BM 425, Technical Manual," *Ransomes*, 40 pgs. (Nov. 1990).

Brochure, "Ransomes 250," *Ransomes America Corp.*, 2 pgs. (1994).

Brochure, "RTS Rotary Cutters," *Risborough Turfcare Supplies Ltd.*, 1 pg. (England 1995) (date established by deposition testimony of David Bruce Crawforth (Attached hereto) at p. 11).

Manual, "Rotary Cutterhead General Information," *Risborough Turfcare Supplies Ltd.*, 15 pgs. (England prior to Feb. 1996) (date established by deposition testimony of David Bruce Crawforth (attached hereto) at p. 135–136).

Dave Buchanan, "Rotaries take to golf courses," *Grounds Maintenance*, pp. 58, 60, 62 (Jan. 1991).

Brochure, "Klippeled Reservedesliste," *Wulff*, 4 pgs. (prior to 1996) (date extablished by declaration of Frede SØrensen (attached hereto).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

Claims 6-19 were not reexamined.

* * * * *